(12) United States Patent
Krishnamurthy

(10) Patent No.: US 6,401,657 B1
(45) Date of Patent: Jun. 11, 2002

(54) AUTOMATIC PET FOOD FEEDER

(76) Inventor: S. Krishnamurthy, 7n0233 Bristol Ct., St. Charles, IL (US) 60175

( * ) Notice: Subject to any disclaimer, the term of this patent is extended or adjusted under 35 U.S.C. 154(b) by 35 days.

(21) Appl. No.: 09/687,286

(22) Filed: Oct. 13, 2000

(51) Int. Cl.[7] .............................. A01K 1/10; A01K 5/00
(52) U.S. Cl. ................................. 119/51.11; 119/57.92
(58) Field of Search .................... 119/51.11, 51.12, 119/57.1, 57.92

(56) References Cited

U.S. PATENT DOCUMENTS

| | | | | |
|---|---|---|---|---|
| 4,508,061 A | * | 4/1985 | Swearingin | 119/57.92 |
| 4,665,862 A | | 5/1987 | Pitchford, Jr. | 119/51.11 |
| 4,735,171 A | | 4/1988 | Essex | 119/51.12 |
| D332,846 S | | 1/1993 | Geuvjehizian | D30/122 |
| 5,299,529 A | * | 4/1994 | Ramirez | 119/51.11 |
| 5,363,805 A | | 11/1994 | Wing | 119/51.11 |
| 6,135,056 A | * | 10/2000 | Kuo | 119/51.11 |
| 6,196,158 B1 | * | 3/2001 | Yang | 119/51.11 |

FOREIGN PATENT DOCUMENTS

| EP | 0555937 A1 | * | 12/1993 | | 119/51.11 |
|---|---|---|---|---|---|

* cited by examiner

*Primary Examiner*—Charles T. Jordan
*Assistant Examiner*—Elizabeth Shaw
(74) *Attorney, Agent, or Firm*—Cook, Alex, McFarron, Manzo, Cummings & Mehler, Ltd.

(57) ABSTRACT

A motorized pet food feeder having a food storage bin with a top and a bottom, the bottom having an opening. A bowl with a back, front, and a bottom is provided which has a housing extending from the back of the bowl. The housing is adapted to removably receive the bottom of the food storage bin. A motor is mounted to the housing that has a rotatable shaft, and an auger is mounted to the rotatable shaft so that its free end extends substantially to above the back of the bowl. A tube is mounted to the housing and encloses the auger, the tube having an open end, coinciding with the free end of the auger and a portion of the tube being cut away to expose from above less than the full diameter of the auger. The cut away portion of the tube is aligned with the opening in the bottom of the food storage bin so that gravity feeds pet food from the food storage bin through the cut-away opening in the tube to the auger which, when rotating, moves the food out the open end of the tube into the bowl. In a preferred embodiment, the tube is cut away to expose from above approximately one-half the diameter of the auger and to expose from the side substantially the entire diameter of the auger. The pet food feeder is adapted to be used with various timing and sensing devices that control the actuation of the motor and the duration of activation, thereby controlling the amount of food transported by the auger to the bowl.

17 Claims, 2 Drawing Sheets

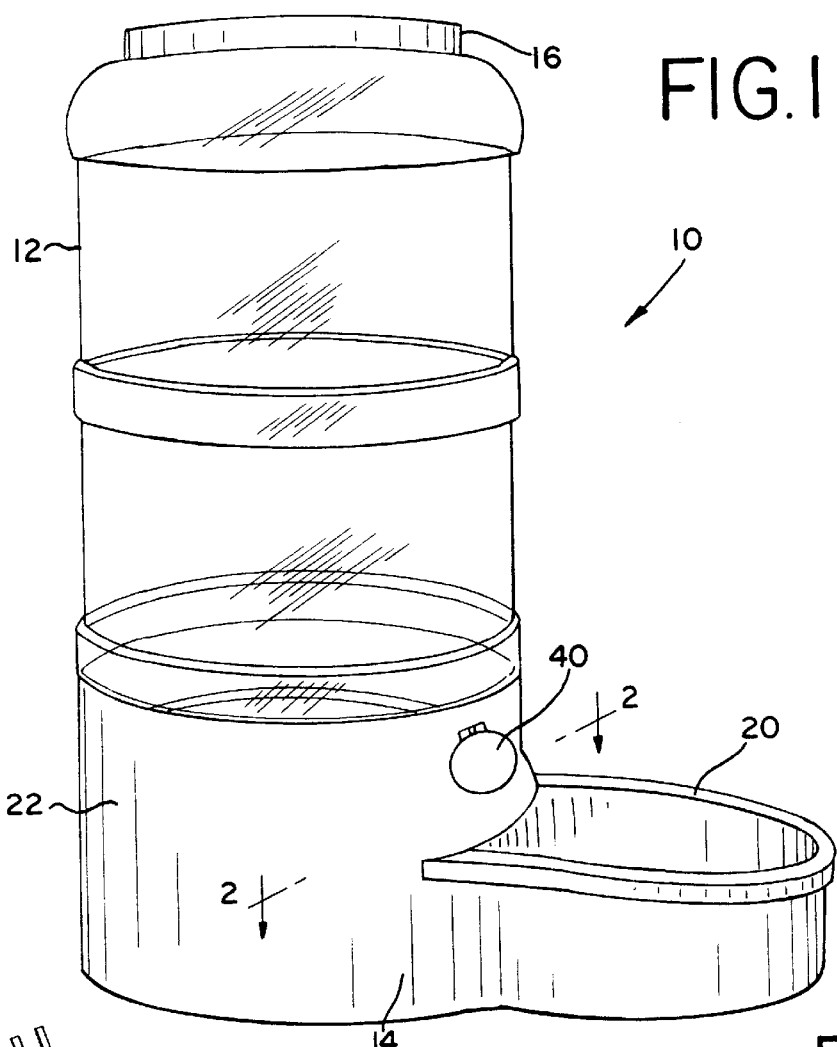
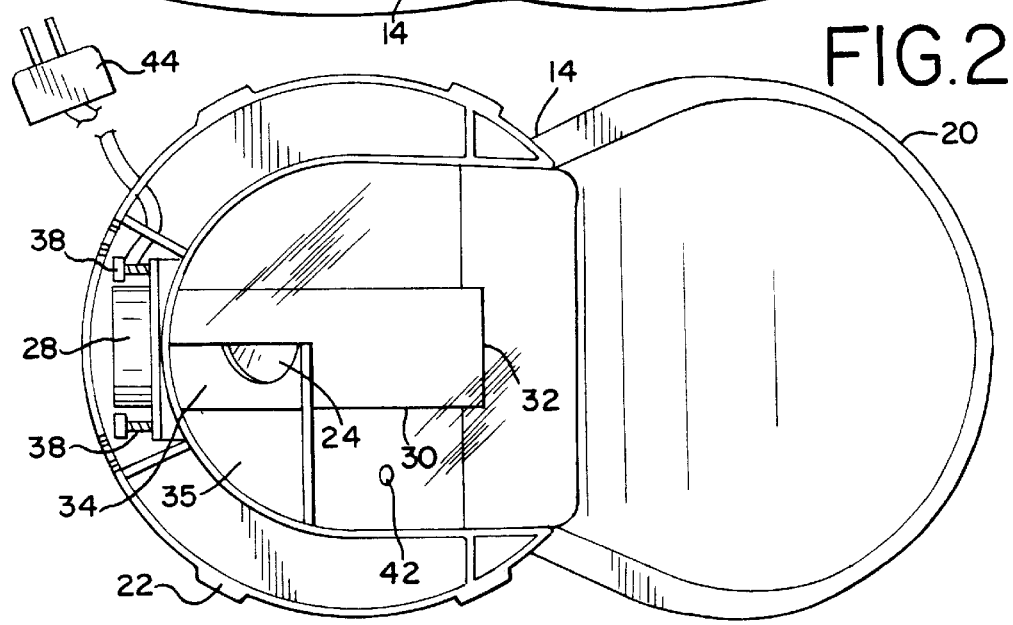

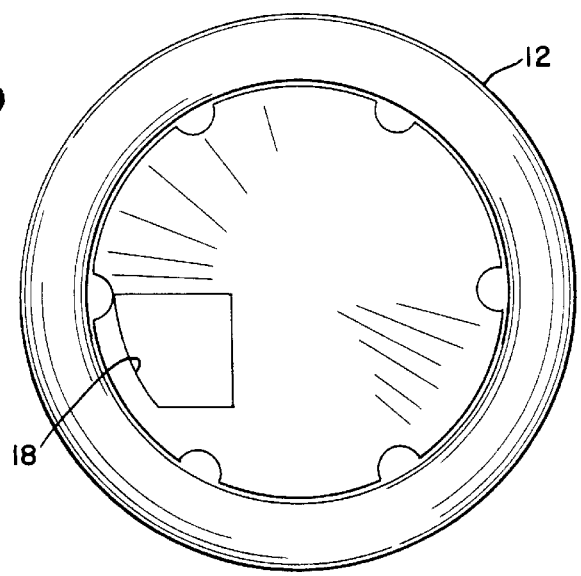
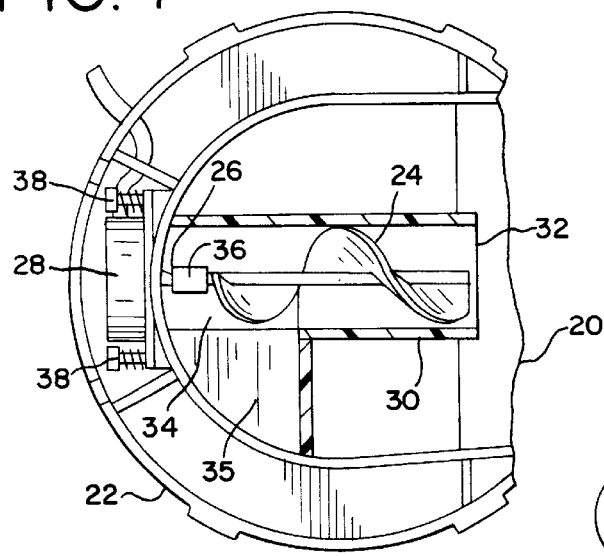
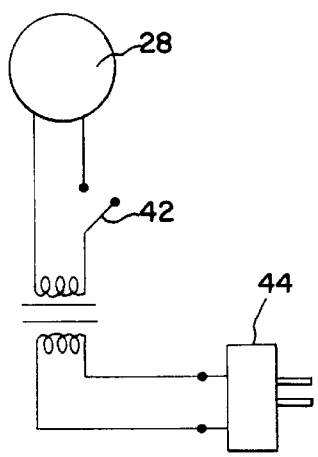

AUTOMATIC PET FOOD FEEDER

BACKGROUND OF THE INVENTION

The present invention relates to a motorized pet food feeder and, more particularly, to a motorized pet food feeder that permits a controlled amount of feed to be dispensed at a predetermined time.

Controlling the diet of pets, and particularly dogs, is important to ensure their health and happiness. In order to have a healthy, hardy dog, it is necessary to monitor its diet carefully, both for quality and quantity. Diets and amounts are based on the individual dog and the life it leads. However, when a diet is established that the dog likes and thrives on, it is very important to stick to it day after day without variation. This goes also to the time of feeding. If one meal is given, feeding in the morning is preferred, as feeding at night can result in the dog going to bed on too full a stomach. If two feedings are given, the day's ration is simply divided between the two meals.

Thus, the proper feeding of a dog entails more than just leaving out a bowl of food for the dog to eat whenever it is hungry. However, because of the busy and irregular schedules of many of today's dog owners, it is difficult to maintain a regular and uniform feeding schedule. In response to this need, a number of automatic pet food feeders have been proposed. One type of these is exemplified by the devices disclosed in U.S. Pat. Nos. 4,735,171 and 4,665,862. The feeders in both of these patents disclose a hopper for storing dried food, which is dispensed from the hopper into a food bowl by means of a rotatable auger. While both of these devices have the benefit of being adapted to timed operation, their design is such that they are likely to crush the feed, which makes it unappealing to the dog, or to jam, so that the device is no longer operable. The occurrence of either the crushing of the food or the jamming of the feeder defeats the whole purpose of having such an automatic pet food feeder, as the end result is that the owner cannot be reliably assured of his dog being fed.

Accordingly, it is an object of the present invention to provide a motorized pet food feeder that reliably and repeatably operates with a reduced likelihood of the crushing of the food or of the jamming of the feeder by the food.

It is an additional object to provide such a pet food feeder which is adapted to regularly and repeatably provide a controlled amount of feed at predictable times.

It is a still further object to provide such a pet food feeder that is simple to operate and safe for both the pet and the owner.

SUMMARY OF THE INVENTION

These objects, as well as others which will become apparent upon reference to the following detailed description and accompanying drawings, are accomplished by a motorized pet food feeder having a food storage bin with a top and a bottom, the bottom having an opening through which food pellets held in the bin are fed. The bin rests upon a base comprising a bowl with a back, front, and a bottom with a housing extending from the back of the bowl. The housing is adapted to removably receive the bottom of the food storage bin. A motor is mounted to the housing that has a rotatable shaft, and an auger is mounted to the rotatable shaft so that its free end extends substantially to above the back of the bowl. A tube is supported by the housing and encloses the auger, the tube having an open end, coinciding with the free end of the auger and a portion of the tube being cut away to expose from above less than the full diameter of the auger. The cut-away portion of the tube is aligned with the opening in the bottom of the food storage bin so that gravity feeds pet food from the food storage bin through the cut-away opening in the tube to the auger which, when rotating, moves the food out the open end of the tube into the bowl. In a preferred embodiment, the tube is cut away to expose from above approximately one-half the diameter of the auger and to expose from the side substantially the entire diameter of the auger. The pet food feeder is adapted to be used with various timing and sensing devices that control the actuation of the motor and the duration of activation, thereby controlling the amount of food transported by the auger to the bowl.

BRIEF DESCRIPTION OF THE DRAWINGS

FIG. 1 is a perspective view of an automatic pet food feeder according to the present invention.

FIG. 2 is a cross-sectional view of the automatic pet food feeder of FIG. 1 taken along lines 2—2 of FIG. 1.

FIG. 3 is a bottom view of a pet food storage bin for use in connection with the present invention.

FIG. 4 is a fragmentary sectional view of the pet food feeder of FIG. 1 showing the relationship between the auger and the feed tube.

FIG. 5 is a circuit diagram showing a safety switch and timer for use in conjunction with the present invention.

DETAILED DESCRIPTION OF THE PREFERRED EMBODIMENT

Turning to the figures of the drawing, there is seen in FIG. 1 a motorized pet food feeder, generally designated as 10, according to the present invention. The pet food feeder 10 comprises two basic parts: a food storage bin 12 and a base member 14.

The food storage bin 12 is removably received in the base member 14 and is preferably made of a clear plastic material and has a removable top 16 through which dried pet food can be added to the bin. The food storage bin 12 is on the order of 15 inches in height, with a diameter of approximately 10 inches. The bottom of the food storage bin 12 includes an opening 18 through which the food pellets flow from the food storage bin 12 to the base portion of the feeder. The bottom of the food storage bin 16 is sloped upwardly from the opening 18 so that the opening acts as a funnel to guide the food pellets into the base 14.

The base 14 has a FIG. 8 configuration (as seen from above, as in FIG. 2) with a bowl portion 20 comprising one lobe of the FIG. 8 and a housing portion 22 comprising the other lobe. The bowl 20 preferably has a diameter of about 10 inches, while the base 14 has an overall length of approximately 16 inches. The bottom of the bowl 20 may be sloped downwardly from back (where the housing 22 is attached) to front to make it easier for the pet to eat the food pellets. A slope of approximately 30° is preferred. An auger 24 is mounted on the shaft 26 of an electric motor 28 within the housing so that a portion of the auger 24 is located below the opening 18 in the bottom of the food storage bin 12.

In keeping with the invention, structure is provided to both prevent the auger 24 from crushing the food pellets when transported from the food storage bin 12 to the bowl 20 and to prevent the food pellets from jamming the auger 24.

To this end, the housing includes a tube 30 that substantially encloses the auger 24. The tube has an open end 32 that is disposed above the rear portion of the bowl 20. In practice, the center of the tube 30 is approximately 6 inches in length and disposed approximately 5 inches above ground level. Further, the tube 30 includes a cut-away portion 34 generally in alignment with the opening in the bottom of the food storage bin. This cut-away portion 34 exposes from above (as seen in FIG. 2) a portion of the diameter of the auger 24 that is less than its full diameter. Preferably, the cut-away portion 34 of the tube exposes approximately one-half of the diameter of the auger 24 from above and substantially the entire diameter of the auger 24 from the side. With this configuration, the food pellets are fed from the side of the auger 24 rather than the top. Accordingly, the auger is never fully loaded with food pellets. This results in a minimal force being exerted by the food pellets on the auger and allows the food feed rate to be consistent, while reducing the incident of crushing of the food pellets or jamming of the auger. The housing 22 may also include an upwardly inclined deflector surface 35 between the bottom of the food storage bin 12 and the cut-away portion 34 of the tube 30 that directs feed from the opening 18 in the bottom of the food storage bin 12 to the exposed portion of the auger 24.

To further reduce the possibility of the crushing of food pellets or jamming of the auger 24, the auger 24 is mounted within the tube only by means of the shaft 26 of the motor 28. Thus, the auger 24 has a free end that roughly coincides with the opening of the auger 24 that is not supported. In other words, there is no structure at the end of the tube 30 that would otherwise be an impedance to the flow of food pellets out of the tube.

In keeping with another aspect of the invention, the auger 24 may be mounted to the shaft 26 of the motor by a resilient coupling 36. This permits the auger 24 to flex at the coupling 36 so as to lessen the likelihood of the auger 24 being jammed by a food pellet caught between it and the tube 30. Alternatively, the auger may be made of a flexible material, or the motor can be resiliently mounted, e.g., by spring loaded screws 38, to obtain the same effect.

In order to further ensure that food pellets will not become jammed in the tube between the wall of the tube and the auger, the clearance between the auger and the tube should be less than the smallest dimension of the food pellet that is being fed through the tube. Preferably, the clearance between the auger and the inside diameter of the tube should be approximately 10% to 25% of the smallest dimension of the feed.

In order to facilitate the flow of food pellets to the front of the bowl, the bowl may be sloped downwardly from its back toward its front. In practice, the bottom of the bowl may have a slope of approximately 30°.

The safety of the automatic pet feeder may be enhanced by providing a hinged cover 40 that fits over the end of the tube 30. The hinged cover 40 restricts access to the auger 24, while permitting food pellets to be moved out of the tube 30 into the bowl 20.

A safety switch 42 may also be incorporated into the device 10 to prevent its operation if the food storage bin 12 is not properly seated onto the base 14. To this end, one of the food storage bin 12 or the base 14 may include a switch 42 that is closed when the food storage bin 12 is properly seated onto the base 14.

Actuation of the motor 28 may be controlled through a timer 44 that controls both when the motor will be actuated and the duration of the time of actuation. By controlling the duration of the time of actuation, the amount of food fed from the food storage bin into the bowl can be controlled.

The motor 28 may be powered by either an external AC power source through a wall socket, or may include batteries so that no external power source is required. The timer 44 may also activate a signal light (not shown) so that when the pet owner has returned home he can know whether the pet feeder 10 was activated during his absence to feed the pet. Similarly, an audible signal may be sounded simultaneously with the actuation of the motor 28 to alert the pet that food is available.

In an alternative embodiment, the feeder 10 may include a magnetic detector which activates the motor 28 upon sensing the proximity of a magnetic member on, e.g., the pet's collar. Thus, the pet can control the amount of feeding to suit its appetite, which is more appropriate for cats than dogs.

Thus, an automatic pet food feeder has been provided meeting all the objects of the invention. While the invention has been described in terms of a preferred embodiment, there is no intent to limit it to the same. Instead the invention is defined by the appended claims.

What is claimed:

1. A motorized pet food feeder comprising:
   a food storage bin having a top and a bottom, the bottom having an opening;
   a bowl having a back, a front, and a bottom;
   a housing extending from the back of the bowl, the housing being adapted to removably receive the bottom of the food storage bin;
   a motor mounted to the housing and having a rotatable shaft;
   an auger having a diameter and further having a first end mounted to the rotatable shaft of the motor and a second free end extending substantially to above the back of the bowl; and
   a tube supported by the housing substantially enclosing the auger, the tube having an open end coinciding with the free end of the auger, a portion of the tube being cut away to expose from above less than the full diameter of the auger, the cut-away portion of the tube being aligned with the opening in the bottom of the food storage bin so that gravity feeds pet food from the food storage bin through the cut-away opening in the tube to the auger, which transports the food out the open end of the tube into the bowl.

2. The pet food feeder of claim 1 wherein the tube is cut away to expose from above approximately one-half the diameter of the auger and to expose from the side substantially the entire diameter of the auger.

3. The pet food feeder of claim 1 wherein the bottom of the bowl slopes downwardly from the back of the bowl to the front.

4. The pet food feeder of claim 3 wherein the bottom of the bowl has a slope of approximately 30°.

5. The pet food feeder of claim 1 wherein the auger is flexibly secured to the shaft of the motor.

6. The pet food feeder of claim 1 wherein the auger is made of a flexible material.

7. The pet food feeder of claim 1 wherein the motor is resiliently mounted to the interior of the housing.

8. The pet food feeder of claim 1 further comprising a timer for controlling the actuation of the motor.

9. The pet food feeder of claim 1 further comprising a sound generator that makes an audible signal simultaneous with the actuation of the motor.

10. The pet food feeder of claim 1 wherein one of the food storage bin and the housing member includes a safety switch that permits actuation of the motor only when the food storage bin is mounted to the housing.

11. The pet food feeder of claim 1 wherein the tube has an inside diameter that results in a clearance with the diameter of the auger that is less than the size of the feed in the storage bin.

12. The pet food feeder of claim 11 wherein the clearance is 10% to 25% of the size of the feed.

13. The pet food feeder of claim 1 further comprising a magnetic detector that actuates the motor by sensing the proximity of a magnetic member.

14. The pet food feeder of claim 1 in which the housing includes an upwardly inclined deflector surface that directs feed from the opening in the bottom of the food storage bin to the cut away portion of the tube enclosing the auger.

15. The pet food feeder of claim 1 in which the bottom of the food storage bin is sloped upwardly from the opening so as to direct feed to the opening.

16. The pet food feeder of claim 1 further comprising a hinged cover affixed to the housing that covers the open end of the tube.

17. The pet food feeder of claim 1 further comprising a light that is activated if the motor has been actuated.

* * * * *